United States Patent [19]

Müller

[11] 4,003,886
[45] Jan. 18, 1977

[54] TETRACARBOXYLIC ACID ESTER SUBSTITUTED DISAZO PIGMENTS

[75] Inventor: Willy Müller, Riehen, Switzerland
[73] Assignee: Ciba-Geigy AG, Basel, Switzerland
[22] Filed: May 13, 1976
[21] Appl. No.: 686,198

Related U.S. Application Data

[63] Continuation-in-part of Ser. No. 461,760, April 17, 1974, abandoned, which is a continuation-in-part of Ser. No. 178,839, Sept. 8, 1971, abandoned.

[30] Foreign Application Priority Data

Sept. 11, 1970 Switzerland .................... 13541/70

[52] U.S. Cl. .................. 260/176; 260/208; 260/174; 106/288 Q
[51] Int. Cl.² ........................................ C09B 43/00
[58] Field of Search .................. 260/176, 208, 193; 106/288 Q

[56] References Cited

UNITED STATES PATENTS

| | | | |
|---|---|---|---|
| 1,999,438 | 4/1935 | Bonhote et al. | 260/176 |
| 3,169,955 | 2/1965 | Siebert et al. | 260/176 |
| 3,413,279 | 11/1968 | Mueller | 260/176 |
| 3,609,135 | 11/1971 | Ribka | 106/288 Q |
| 3,711,461 | 1/1973 | Pretzer et al. | 260/208 |

FOREIGN PATENTS OR APPLICATIONS

| | | | |
|---|---|---|---|
| 1,076,635 | 7/1967 | United Kingdom | 260/176 |
| 1,066,769 | 4/1967 | United Kingdom | 260/176 |

*Primary Examiner*—Charles F. Warren
*Attorney, Agent, or Firm*—Vincent J. Cavalieri

[57] ABSTRACT

A compound of the formula

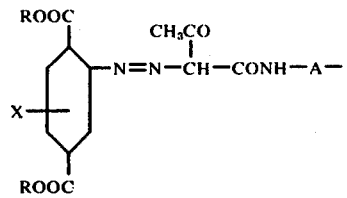

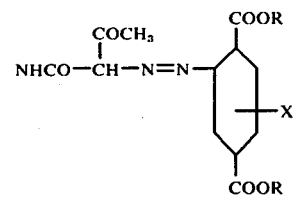

in which A represents phenylene which may be substituted by chlorine, bromine, methyl, methoxy, ethoxy or cyano, X represents hydrogen or chlorine, and R represents methyl or ethyl, was prepared. The compounds are useful for pigmenting high molecular organic materials such as polyamides, polyurethanes and polyesters. The compounds have excellent fastness to light, migration, weather and to alkali.

3 Claims, No Drawings

TETRACARBOXYLIC ACID ESTER SUBSTITUTED DISAZO PIGMENTS

This is a continuation-in-part application of our patent application Ser. No. 461,760, filed Apr. 17, 1974, now abandoned, which in turn is a continuation-in-part application of our patent application Ser. No. 178,839, filed Sept. 8, 1971, now abandoned.

The present invention is based on the observation that valuable disazo pigments of the formula

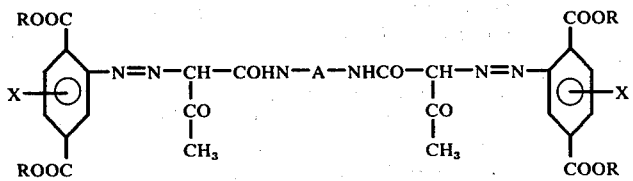

are obtained, in which A represents phenylene which may be substituted by chlorine, bromine, methyl, methoxy, ethoxy or cyano, X represents hydrogen or chlorine, and R represents methyl or ethyl, if a diazo or diazoamino compound of an aminoterephthalic acid dialkyl ester of the formula

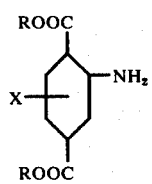

is coupled with a diacetoacetyl-arylenediamine of the formula

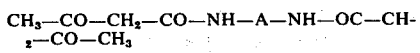

in the molar ratio 2:1.

Since the dyes according to the invention are pigments, water-solubilising groups, such as sulphonic acid or carboxylic acid groups, are naturally excluded.

The phenylene A of the diacetoacetyl-phenylene diamine is preferably a radical of the formula

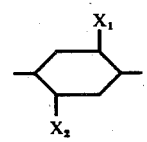

in which $X_1$ and $X_2$ represent hydrogen, chlorine, bromine, methyl, methoxy, ethoxy or cyano.

The diacetoacetyl-arylenediamines are obtained in simple manner by the action of diketene or ethyl acetoacetate on aromatic diamines such, for example, as 1,4-phenylenediamine
1,3-phenylenediamine
1,3-diamino-4-methylbenzene
1,3-diamino-4-methoxybenzene
1,3-diamino-4-chlorobenzene
1,3-diamino-2,5-dichlorobenzene
1,3-diamino-4,6-dichlorobenzene
1,4-diamino-2-chlorobenzene
1,4-diamino-2-bromobenzene
1,4-diamino-2-cyanobenzene
1,4-diamino-2-methylbenzene
1,4-diamino-2,5-dichlorobenzene
1,4-diamino-2-chloro-5-methylbenzene
1,4-diamino-2,5-dimethylbenzene
1,4-diamino-2-chloro-5-methoxybenzene
1,4-diamino-2-methyl-5-methoxybenzene
1,4-diamino-2,5-dimethoxybenzene
1,4-diamino-2-methoxybenzene
1,4-diamino-2-ethoxybenzene
1,4-diamino-2,5-diethoxybenzene.

The diacetoacetyl-arylenediamines are coupled with diazotised aminoterephthalic acid esters of the formula

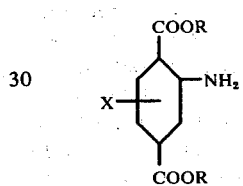

in which R represents methyl or ethyl and X represents hydrogen or chlorine.

The following aminocarboxylic acid esters may be cited as examples:

2-aminophenyl-1,4-dicarboxylic acid methyl ester
2-aminophenyl-1,4-dicarboxylic acid ethyl ester
2-aminophenyl-1-carboxylic acid methyl ester-4-carboxylic acid ethyl ester
2-amino-5-chloro-1,4-dicarboxylic acid methyl ester
2-amino-5-chloro-1,4-dicarboxylic acid ethyl ester.

The coupling preferably takes place in a weakly acid medium, advantageously in the presence of the customary agents which promote coupling, especially dispersing agents, for example aralkyl sulphonates, for example dodecylbenzene sulphonate or 1,1'-dinaphthylmethane-2,2'-disulphonic acid or polycondensation products of alkylene oxides. The dispersion of the coupling component can also advantageously contain protective colloids, for example methylcellulose or minor amounts of inert organic solvents that are sparingly soluble or insoluble in water, for example optionally halogenated or nitrated aromatic hydrocarbons, for example benzene, toluene, xylene, chlorobenzene, dichlorobenzenes or nitrobenzene, as well as aliphatic halogenated hydrocarbons, for example carbon tetrachloride or trichloroethylene, and also organic solvents that are miscible with water, for example acetone, methyl ethyl ketone, methanol, ethanol or isopropanol.

The coupling can also advantageously be carried out by continuously combining an acid solution of the diazonium salt with an alkaline solution of the coupling component in a mixing nozzle, whereupon coupling of the components takes place immediately. Care must be taken that the diazo component and the coupling component are present in equimolecular amounts in the mixing nozzle, or advantageously by a slight excess of the diazo component. This is most simply achieved by controlling the pH value of the liquid in the mixing nozzle. It is also necessary to ensure that the two solutions in the mixing nozzle are violently agitated. The dyestuff dispersion produced is continuously withdrawn from the mixing nozzle and the dyestuff is isolated by filtration.

The coupling can also be carried out by heating a diazoamino compound of an amine of the formula

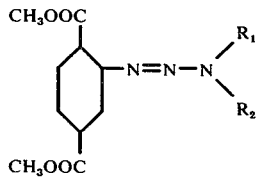

with the diacetoacetylarylenediamine in an organic solvent, or if desired in an aqueous-organic solvent, preferably in the presence of an acid.

The aryldiazoamino compounds to be used according to the process can be obtained according to known processes by coupling an aryldiazonium salt with a primary amine or preferably with a secondary amine. The most diverse amines are suitable for this purpose, for example aliphatic amines, for example methylamine, ethylamine, ethanolamine, propylamine, butylamine, hexylamine and especially dimethylamine, diethylamine, diethanolamine, methylethanolamine, dipropylamine or dibutylamine, aminoacetic acid, methylaminoacetic acid, butylaminoacetic acid, aminoethane sulphonic acid, methylaminoethane sulphonic acid, guanylethane sulphonic acid, $\beta$-aminoethyl sulphuric acid; alicyclic amines for example cyclohexylamine, N-methylcyclohexylamine or dicyclohexylamine; aromatic amines, for example 4-aminobenzoic acid, sulphanilic acid, 4-sulpho-2-aminobenzoic acid, (4-sulphophenyl)-guanidine, 4-N-methylaminobenzoic acid, 4-ethylaminobenzoic acid, 1-aminonaphthalene-4-sulphonic acid and 1-aminonaphthalene-2,4-disulphonic acid; heterocyclic amines, for example piperidine, morpholine, pyrrolidine and dihydroindole and finally also sodium cyanamide or dicyandiamide.

As a rule, the diazoamino compounds obtained are sparingly soluble in cold water and can be isolated from the reaction medium in a crystalline form, if necessary after salting-out. In many cases, the moist press cakes can be used for the further reaction. In individual cases, it may be advisable to dehydrate the diazoamino compounds before the reaction by vacuum drying or, after suspending the moist press cake in a solvent, to remove the water by azeotropic distillation.

The coupling of the diazoamino compound with the naphthol takes place in an organic solvent, for example chlorobenzene, o-dichlorobenzene, nitrobenzene, pyridine, ethylene glycol, ethylene glycol monomethyl ether or ethylene glycol monoethyl ether, dimethylformamide, formic acid or acetic acid. When using solvents which are miscible with water, it is not necessary to use the diazoamino compounds in an anhydrous form, for example the moist filter cakes as mentioned above may be used. The splitting of the diazoamino compound which precedes the coupling takes place in an acid medium. When neutral solvents are used, the addition of an acid, for example hydrochloric acid, sulphuric acid, formic acid or acetic acid, is necessary.

The coupling is advantageously carried out with heating, preferably at a temperature of from 80° to 180° C, and generally takes place very rapidly and completely.

Owing to their insolubility, the pigments obtained can be isolated from the reaction mixtures by filtration. It is advantageous to subject the pigments obtained to an aftertreatment with an organic solvent, preferably one that boils above 100° C. Particularly suitable are benzenes substituted by halogen atoms, alkyl or nitro groups, such as xylene, chlorobenzene, o-dichlorobenzene or nitrobenzene, and pyridine bases, such as pyridine, picoline or quinoline; suitable too are ketones, such as cyclohexanone, ethers, such as ethylene glycol monomethyl- or monoethyl ether, amides, such as dimethylformamide, or N-methylpyrrolidone, and sulphoxone.

The aftertreatment is carried out preferably by heating the pigment in the solvent to 100° to 150° C, when in many cases a coarsening of the particles occurs — a factor which exerts a favourable influence on the fastness to alkali, weather, light, and migration of the pigments obtained.

Finally, the coupling can be carried out in such a way that the amine to be diazotised is suspended with the coupling component in the molar ratio 2:1 in an organic solvent and treated with a diazotising agent, in particular an ester of nitrous acid, such as methyl, ethyl, butyl, amyl or octyl nitrite.

The new colouring matters are valuable pigments which in a finely divided form can be used for pigmenting high molecular organic material, for example cellulose ethers and cellulose esters, polyamide or polyurethanes or polyesters, acetylcellulose, nitrocellulose, natural or synthetic resins, for example aminoplasts, especially urea-formaldehyde and melamine-formaldehyde resins, alkyd resins, phenoplasts, polycarbonates, polyolefines, for example polyethylene, polypropylene, polystyrene, polyvinyl chloride, polyacrylonitrile, polyacrylic acid esters, rubber, casein, silicone and silicone resins, singly or as mixtures. In these cases it does not matter whether the high molecular organic compounds mentioned are in the form of plastic masses or melts, or in the form of spinning solutions, lacquers or printing inks. Depending on the end use, it is advantageous to use the new pigments as toners or in the form of preparations. Besides the pure pigment, the preparations may also for example contain in addition natural resins, for example abietic acid or its esters, ethyl cellulose, cellulose acetobutyral, alkali earth salts of higher fatty acids, fatty amines, for example stearyl amine or rosin amine, vinyl chloride-vinyl acetate copolymers, polyacrylonitrile or polyterpene resins or water-soluble dyes, for example sulphonic acid dyes or their alkali earth salts. Compared with the benzidine yellow pigments, the pigments according to the invention posses the advantage of not requiring the physiologically harmful benzidine as intermediate product. Compared with the dyes of U.S. Pat. No. 1,999,438, the pigments according to the invention are distinguished by better fastness to migration and compared with the dyes of British Pat. No. 1,076,635 they are distinguished by better fastness to alkali and to weather.

In the Examples which follow, the parts and percentages are by weight unless otherwise stated.

according to the particulars given in Example 1 in the molar ratio 2:1. The resulting dyestuffs correspond to the formula

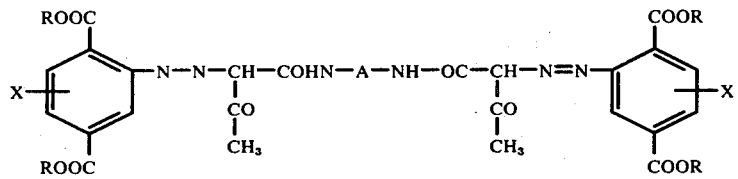

EXAMPLE 1

20.9 Parts of 2-amino-terephthalic acid dimethyl ester are stirred in 100 parts by volume of water and 25 parts by volume of concentrated hydrochloric acid. Diazotisation is carried out at 0°–2° with 25 parts by volume of 4 N sodium nitrite solution. The diazo solution is filtered and made up to 400 parts by volume, and the pH is adjusted to 4 by adding 30 parts of crystallised sodium acetate. To this diazo solution is added in the course of an hour, dropwise and with stirring, a solution of 16.2 parts of 2-chloro-5-methyl-1,4-bisacetoacetyl-aminobenzene in 250 parts by volume of water and 20 parts by volume of 30% sodium hydroxide solution. The coupling proceeds very rapidly and when the dropwise addition of the naphthol solution is complete, no more diazo compound can be detected in the suspension. Stirring is continued for 1 hour at room temperature, then the suspension is heated to 80°–85° C and filtered. The filter residue is washed free of salt with hot water and dried. The thus obtained yellow pigment of the formula

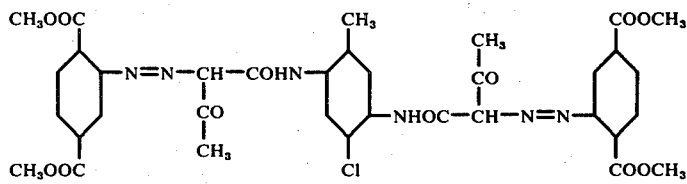

colour plastics and lacquers in transparant greenish yellow shades.

30 Parts of the above pigment are stirred in 300 parts of o-dichlorobenzene for 2 hours at 130°–135° C, then filtered at 100° C, washed with hot dichlorobenzene and subsequently with methanol and dried. A yellow pigment with improved rheological properties is thus obtained.

The following table lists further pigments which are obtained by coupling the diazo compound of an aminoterephthalic acid ester of the formula

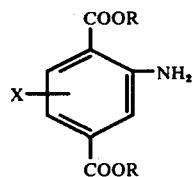

with a diacetoacetic-arylenediamine of the formula

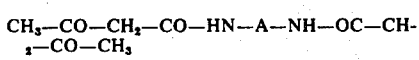

The meaning of the symbols given in the formulae can be read from columns 2–4 of the table.

Table

| No. | X | R | A | Shade of 0.2% colouration in polyvinyl chloride |
|---|---|---|---|---|
| 2 | —H | —CH$_3$ | (phenyl) | Greenish yellow |
| 3 | —H | —CH$_3$ | (Cl-phenyl) | " |
| 4 | —H | —CH$_3$ | (di-Cl-phenyl) | " |
| 5 | —H | —CH$_3$ | (methylphenyl) | Neutral yellow |
| 6 | —H | —CH$_3$ | (OCH$_3$, Cl-phenyl) | Reddish yellow |
| 7 | —H | —CH$_3$ | (OCH$_3$, CH$_3$-phenyl) | orange |
| 8 | —H | —CH$_3$ | (di-Br-phenyl) | Greenish yellow |
| 9 | —H | —CH$_3$ | (CN-phenyl) | Greenish yellow |
| 10 | —H | —CH$_3$ | (phenyl) | Very greenish yellow |

Table-continued

| No. | X | R | A | Shade of 0.2% colouration in polyvinyl chloride |
|---|---|---|---|---|
| 11 | —H | —CH$_3$ | (2,5-dichlorophenyl) | " |
| 12 | —H | —CH$_3$ | (2,5-dimethylphenyl) | Greenish yellow |
| 13 | —H | —CH$_3$ | (2,4-dichloro-6-methylphenyl) | " |
| 14 | —H | —CH$_3$ | (2-methylphenyl) | Neutral yellow |
| 15 | —H | —CH$_3$ | (2-methoxy-5-methylphenyl) | Reddish yellow |
| 16 | —H | —CH$_3$ | (2-ethoxyphenyl) | " |
| 17 | —H | —CH$_3$ | (2,5-diethoxyphenyl) | Reddish orange |
| 18 | —H | —C$_2$H$_5$ | (phenyl) | Greenish yellow |
| 19 | —H | —C$_2$H$_5$ | (2-methyl-4-chloro-6-methylphenyl) | Neutral yellow |
| 20 | —H | —C$_2$H$_5$ | (2-methoxy-5-chlorophenyl) | Reddish yellow |
| 21 | —H | —C$_2$H$_5$ | (2-methoxyphenyl) | " |
| 22 | —H | —C$_2$H$_5$ | (2,4-dimethylphenyl) | " |
| 23 | —H | —C$_2$H$_5$ | (2-methoxy-3,5-dimethylphenyl) | Orange |
| 24 | —Cl | —CH$_3$ | (phenyl) | Greenish yellow |

EXAMPLE 25

30 Parts of the diazoamino compound of the formula

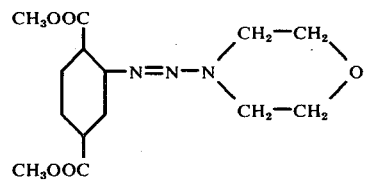

(manufactured by coupling diazotised 2-aminoterephthalic acid dimethyl ester to morpholine in an alkaline medium) and 15.3 parts of 2-methoxy-1,4-bisacetoacetyl-aminobenzene are stirred in 500 parts of glacial acetic acid and the mixture is heated to 110°–115° C in the course of 1 hour. After stirring for 3 hours at this temperature, the product is filtered hot and washed with hot glacial acetic acid, subsequently with methanol and then with water. Upon drying, the filtrate yields 34 parts (98% of theory) of the yellow pigment of the formula

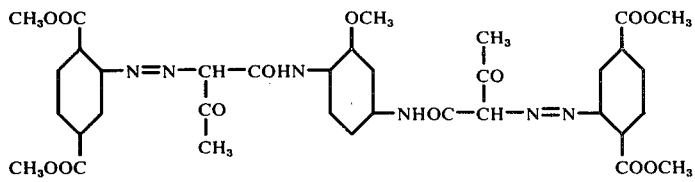

This pigment colours plastics and lacquers in powerful yellow shades possessing excellent fastness to migration, overlacquering and light.

EXAMPLE 26

23.7 Parts of 2-amino-terephthalic acid diethyl ester are stirred in 200 parts of water with 30 parts of concentrated hydrochloric acid for 1 hour at 0°–5° C. Diazotisation is then carried out at 0° C with 25 parts of 4 N sodium nitrite solution while adding ice. The diazo solution is filtered and made up to a volume of 600 parts and adjusted to a temperature of 0° C. The excess of nitrous acid present is annulled by adding small amounts of sulphamic acid, and the solution is then adjusted to pH 4 by adding 30 parts of crystallised sodium acetate.

On the other hand, 16.2 parts of 2-chloro-5-methyl-1,4-bisacetoacetylaminobenzene with 30 parts of 30% sodium hydroxide solution in 400 parts of water are dissolved at 40°–45° C. The solution is filtered clear with 0.2 parts of decolourising carbon and upon addition of 2 parts of n-butyl-sulphoricinoleate, made up to a volume of 600 parts.

These two solutions are, if necessary after diluting them with water, continuously fed to a mixing jet, whereupon an immediate coupling of the components takes place. Regulating the supply of the solutions ensures that the pH value in the mixing jet lies between 4.5 and 5.5. The temperature should be approx. 30° C. This adjustment can be regulated by adding water to the solutions of the components. The resulting dyestuff suspension is filtered off and the filter residue rinsed. This latter is then stirred with 800 parts of o-dichlorobenzene and the water distilled off azeotropically. As soon as the internal temperature has reached 120° C, the product is filtered and the filtrate washed with hot o-dichlorobenzene and then with methanol and dried in vacuo at 70° C.

The yellow pigment obtained in this way in good yield corresponds to the dyestuff described in Example 1 both in its tinctorial and in its fastness properties.

EXAMPLE 27

20.9 Parts of 2-amino-terephthalic acid dimethyl ester are stirred together with 15.2 parts of 2,5-dimethyl-1,4-bisacetoacetyl-aminobenzene in 1000 parts of o-dichloro-benzene. After adding 50 parts of glacial acetic acid the mixture is heated to 45°–50° C and a solution of 15 parts of tert.butyl nitrite in 100 parts of o-dichlorobenzene is added dropwise thereto in the course of 1½ hours. Upon completion of the dropwise addition, the batch is heated to 120° C in the course of 1 hour, kept at this temperature for 1 hour and the product is filtered hot. The filtrate is washed with hot o-dichlorobenzene until the washings run colourless, then with methanol and finally with water.

After drying in vacuo at 70° C, 34.5 parts (=92% of theory) of a yellow pigment are obtained which colours plastics and lacquers in powerful reddish yellow shades possessing excellent fastness properties.

EXAMPLE 28

65 Parts of stabilised polyvinyl chloride, 35 parts of dioctylphthalate and 0.2 parts of the dyestuff obtained according to Example 1 are stirred together and then the mixture is worked to and fro for 7 minutes at 140° C on a two roll mill. A yellow coloured sheet is obtained possessing very good fastness to light and migration.

I claim:
1. A compound of the formula

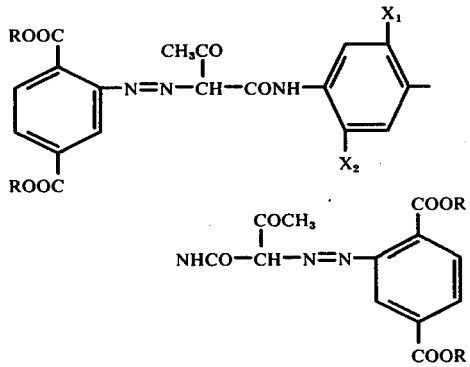

in which $X_1$ and $X_2$ represent hydrogen, chlorine, bromine, methyl, methoxy, ethoxy or cyano and R represents methyl or ethyl, which has been subjected to an aftertreatment, said aftertreatment consisting of heating said compound in an inert organic liquid at a temperature of from 100° C to 150° C.

2. A compound according to claim 1 in which R represents methyl.

3. The compound according to claim 1 which has been subjected to an aftertreatment said aftertreatment consisting of heating the compound in an inert organic solvent selected from the group consisting of a benzene substituted by halogen, alkyl or nitro, a pyridine base, a ketone, an ether, an amide, N-methylpyrrolidone or a sulphoxone at a temperature of from 100° C to 150° C.

* * * * *